United States Patent [19]

Will et al.

[11] 4,040,916

[45] Aug. 9, 1977

[54] ZINC PLATING BATH AND METHOD OF FORMING A NON-DENDRITIC ZINC LAYER

[75] Inventors: Fritz G. Will; Fred F. Holub, both of Schenectady, N.Y.

[73] Assignee: General Electric Company, Schenectady, N.Y.

[21] Appl. No.: 715,226

[22] Filed: Aug. 18, 1976

Related U.S. Application Data

[63] Continuation-in-part of Ser. No. 636,204, Nov. 28, 1975, abandoned.

[51] Int. Cl.² .................. C25D 3/22; H01M 10/26
[52] U.S. Cl. ............................ 204/55 R; 429/198
[58] Field of Search ................ 204/55 R, 55 Y; 429/198

[56] References Cited

U.S. PATENT DOCUMENTS

| | | | |
|---|---|---|---|
| 2,915,554 | 12/1959 | Ahlbrecht et al. | 260/556 |
| 3,653,965 | 4/1972 | Lee | 429/198 |
| 3,787,297 | 1/1974 | Beckwith et al. | 204/55 Y |
| 3,930,882 | 1/1976 | Ohsawa et al. | 429/207 |

*Primary Examiner*—Donald L. Walton
*Attorney, Agent, or Firm*—Paul R. Webb, II; Joseph T. Cohen; Jerome C. Squillaro

[57] ABSTRACT

A method is described for forming a non-dendritic zinc layer which includes providing a deposition solution containing a zinc compound and from 0.001 to 10 weight percent of a non-ionic surfactant additive of oxaalkyl or polyoxaalkyl perfluoroalkane sulfonamide, positioning a pair of spaced apart electrodes within the solution, applying an electric current to the electrodes, and depositing a non-dendritic zinc layer on the negative electrode.

10 Claims, No Drawings

ZINC PLATING BATH AND METHOD OF FORMING A NON-DENDRITIC ZINC LAYER

This application is a continuation-in-part of application Ser. No. 636,204 filed Nov. 28, 1975, now abandoned, filed in the same names and under the same title.

This invention relates to an improved method for forming a non-dendritic zinc layer from a deposition solution and to such a deposition solution.

During the electrodeposition of zinc, as it applies to the charging of batteries with zinc electrodes and to the electroplating of zinc, metallic dendrites usually form. The dendrite problem is especially severe at high current densities and long deposition times. During battery cycling, dendrites cannot be discharged at reasonable current densities and, eventually, they grow through separator materials, causing battery shorting. This problem has thus far retarded commercialization of rechargeable zinc-air and zinc/nickel batteries.

Abundant use is being made of additives, both organic and inorganic, in the electroplating industry to prevent dendrite growth. Dozens of compounds are known in the art to be more or less effective to reduce dendrite growth under carefully controlled conditions. However, most of these additives react on the electrode during deposition and have to be replenished frequently. Additives have also been used in batteries to suppress dendrites; but these additives lack long-term stability, and soon loose their effectiveness during charge/discharge cycling. They are either reduced on the zinc electrode or oxidized chemically or electrochemically. We have tested a great number of these known additives and ascertained their lack of stability over longer periods of time.

As opposed to the above discussed additives and deposition processes, the present invention is directed to an improved method for forming a non-dendritic zinc layer and improved deposition solution for such a method. Further, the subject deposition solution has particular utility in rechargeable batteries such as zinc/bromine and zinc/chlorine batteries.

The primary objects of our invention are to provide a dendrite-inhibiting method of forming a zinc layer and to provide a dendrite-inhibiting deposition solution containing a dendrite-inhibiting additive that is particularly stable, both to reduction and oxidation, and furthermore, is effective in small amounts.

In accordance with one aspect of our invention, a method for forming a non-dendritic zinc layer includes providing a deposition solution containing a zinc compound, and from 0.001 to 10 weight percent of a non-ionic surfactant additive of an oxaalkyl or a polyoxaalky perfluoroalkane sulfonamide, positioning a pair of spaced apart electrodes within the solution, applying an electric current to the electrodes, and depositing a non-dendritic zinc layer on the negative electrode.

Reference is made to U.S. Pat. No. 2,915,554 issued Dec. 1, 1959, under the title of "Non-Ionic Surfactant Derivatives of Perfluoro Alkane-Sulfonamides" for methods of preparation of non-ionic surfactant derivatives. The non-ionic surfactant additives of the present invention can be prepared in a similar manner.

These and various other objects, features and advantages of the invention will be better understood from the following description:

We found unexpectedly that certain non-ionic surfactant additives of oxaalkyl and polycxaalkyl perfluoroalkane sulfonamides are superior to the other above compounds tested in the electroplating of zinc, wherever thick deposits or long-terms operation without additive replacement are desirable. We have found further that such surfactant additives inhibit effectively the growth of dendrites during cycling of zinc electrodes in batteries. The non-ionic surfactant additives of oxaalkyl and polyoxaalkyl perfluoroalkane sulfonamides incorporated into our deposition solution and into our method for forming a non-dendritic zinc layer have the formula:

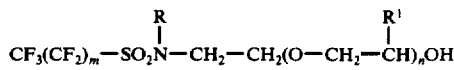

where $m$ is a number from 3 to 15, R is alkyl radical having from 1 to 10 carbon atoms, $R^1$ is a member of a group consisting of hydrogen and methyl radical, $n$ is a number for the group from 0 to 30, and the surfactant additive has a molecular weight range of approximately 550–1500.

The above class of non-ionic surfactant additives is far more stable towards both reduction and oxidation in rechargeable batteries with zinc electrodes than any other of a large number of compounds tested. We found further that the above non-ionic surfactant additives were effective while ionic fluorinated surfactants additives were ineffective.

We found that we could form a non-dendritic zinc layer which is particularly useful in electroplating of zinc and in rechargeable zinc batteries. In our method we provide a deposition solution containing a zinc compound from which the zinc will be deposited on a metallic or other conducting surface, such as graphite or carbon, and containing a non-ionic surfactant additive having the above formula. In the electroplating of zinc, a conventional bath or deposition solution is employed which contains the zinc compound. In a rechargeable zinc battery, the negative electrode compartment of the battery contains the zinc compound from which zinc will be deposited on the negative electrode. Such negative electrode may be made of certain metals, such as copper, tin or lead, and also of graphite or carbon. A non-ionic surfactant additive, which has the above formula, is incorporated into the electroplating bath or into the battery negative compartment electrolyte on a weight basis from 0.001 to 10 percent. The preferred range is 0.1 to 1 percent. This electroplating solution or the above electrolyte solution with the specific non-ionic surfactant additive provides the deposition solution of our invention. We found further that a preferred negative compartment electrolyte contains on a weight basis 53.40 to 63.399% $H_2O$, 15.9% $ZnBr_2$, 15.9% KBr, 3.2% $Al_2(SO_4)_3$ and 1.6% $H_3BO_3$. The ionic surfactant additive comprises on a weight basis 0.001 to 10 percent of the deposition solution.

In our method for forming a non-dendritic zinc layer, a pair of spaced apart electrodes are positioned within the above type of deposition solution containing one of the above specific additives. An electric current is applied across the cell thereby depositing a non-dendritic zinc layer on the negative electrode. The current density and time of deposit are conventionally adjusted to provide the desired zinc layer thickness.

Examples of deposition solution and of method for forming a non-dendritic zinc layer in accordance with our invention are set forth below.

EXAMPLE I

A deposition solution was made in accordance with our invention containing a zinc compound of zinc bromide, $ZnBr_2$. The deposition solution comprised a solution containing on a weight basis 62.4% $H_2O$, 15.9% $ZnBr_2$, 15.9% KBr, 3.2% $Al_2(SO_4)_3$ and 1.6% $H_3BO_3$, and 1.0% on non-ionic surfactant additive having the formula:

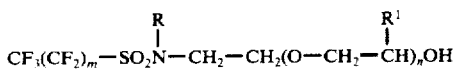

where $m$ is a number from 3 to 15, R is alkyl radical having from 1 to 10 carbon atoms $R^1$ is a methyl radical, $n$ is a number for the group from 0 to 30, and the surfactant additive has a molecular weight range of approximately 550–1500.

A chemical analysis of the above non-ionic surfactant additive disclosed the following percentages of carbon, hydrogen, nitrogen, sulfur and fluorine: 39.67% carbon, 5.63% hydrogen, 0.50% nitrogen, 1.70% sulfur, and 36.56% fluorine.

EXAMPLE II

A deposition solution was made in accordance with our invention containing a zinc compound of zinc bromide, $ZnBr_2$. The deposition solution comprised a solution containing on a weight basis 63.3% $H_2O$, 15.9% $ZnBr_2$, 15.9% KBr, 3.2% $Al_2(SO_4)_3$ and 1.6% $H_3BO_3$, and 0.1% on non-ionic surfactant additive having the formula:

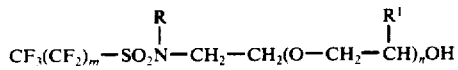

where $m$ is a number from 3 to 15, R is alkyl radical having from 1 to 10 carbon atoms, $R^1$ is a methyl radical, $n$ is a number for the group from 0 to 30, and the surfactant additive has a molecular weight range of approximately 550–1500.

A chemical analysis of the above non-ionic surfactant additive disclosed the following percentages of carbon, hydrogen, nitrogen, sulfur and fluorine: 39.13% carbon, 5.21% hydrogen, 0.50% nitrogen, 2.12% sulfur, and 37.10% flourine.

EXAMPLES III AND IV

In Cell No. 1, corresponding to Example III, zinc was electro-deposited onto a 1 × 1 cm copper foam substrate from an aqueous solution containing a zinc compound, and other inorganic salts: namely, on a weight basis, 63.4% $H_2O$, 15.9% $ZnBr_2$, 15.9%KBr, 3.2% $Al_2(SO_4)_3$ and 1.6% $H_3BO_3$. The counter electrode was a 1 × 1 cm zinc foil at a distance of 2.5 cm from the copper electrode. The deposition was carried out at a current density of 100 ma/$cm^2$ at room temperature in unstirred solution.

Cell No. 2, corresponding to Example IV, was identical to Cell No. 1, except that the aqueous solution contained 62.4% $H_2O$ and 1% of the non-ionic surfactant additive of Example 1. Cells Nos. 1 and 2 were electrically connected in series. The method performed in cell 1 was not in accordance with our method while the method performed in cell 2 was in accordance with the method of our invention.

The first cell, No. 1, contained a deposition solution with a zinc compound but without a non-ionic surfactant additive in accordance with our invention. Thus, the deposition solution in Cell No. 1 was not in accordance with our invention. The second cell, No. 2, contained the above solution with a zinc compound and had incorporated therein 1% by weight of the non-ionic surfactant additive of Example 1. The deposition solution in Cell No. 2 was in accordance with our invention. The zinc deposition was continued for a period of three hours. Thus, the method for forming a zinclayer in Cell No. 1 was not in accordance with our invention, while the method of forming a zinc layer in Cell No. 2 was in accordance with our invention.

At the end of 2 hours, a long dendrite had grown in Cell No. 1 and lead to electrode shorting. No dendrites were observed in Cell No. 2. At the end of three hours, cell operations were terminated for convenience. The shorting of Cell No. 1 and the visual observation that a long dendrite grew in the deposition solution of Cell No. 1 thereby showed that a dendritic zinc layer as opposed to a non-dendritic layer was formed. In Cell No. 2 our method lead to the formation of a non-dendritic zinc layer since no dendrites could be seen.

EXAMPLE V AND VI

In Cell No. 3, corresponding to Example V, zinc was electro-deposited onto a 1 × 1 cm copper foam substrate from an aqueous solution containing a zinc compound and other inorganic salts; namely, on a weight basis, 63.4% $H_2O$, 15.9% KBr, 3.2% $Al_2(SO_4)_3$ and 1.6% $H_3BO_3$. The counter electrode was a 1 × 1 cm zinc foil at a distance of 2.5 cm from the copper electrode. The deposition was carried out at a current density of 100 ma/$cm^2$ at room temperature in unstirred solutions.

Cell No. 4, corresponding to Example VI, was identical to Cell No. 3, except that the aqueous solution contained 63.3% $H_2O$ and 0.1 of the non-ionic surfactant additive of Example II. Cells Nos. 3 and 4 were electrically connected in series. The method performed in Cell 3 was not in accordance with our method while the method performed in Cell 4 was in accordance with the method of our invention.

Cell No. 3, contained a deposition solution with a zinc compound but without a non-ionic surfactant additive in accordance with our invention. Thus, the deposition solution in Cell No. 3 was not in accordance with our invention. Cell No. 4, contained the above solution with a zinc compound and had incorporated therein 0.1% by weight of the non-ionic surfactant additive of Example II. The deposition solution in Cell No. 4 was in accordance with our invention. The zinc deposition was continued for a period of three hours. Thus, the method for forming a zinc layer in Cell No. 3 was not in accordance with our invention, while the method of forming a zinc layer in Cell No. 4 was in accordance with our invention.

At the end of two hours, a long dendrite had grown in Cell No. 3 and lead to electrode shorting. No dendrites were observed in Cell No. 4. At the end of three hours, cell operations were terminated for convenience. The shorting of Cell No. 3 and the visual observation that a long dendrite grew in the deposition solution of Cell No. 3 thereby showed that a dendritic zinc layer as opposed to a non-dendritic layer was formed. In Cell No. 4 our method lead to the formation of a non-dendritic zinc layer. As opposed to Cell No. 3, there was only some dendrite growth in Cell No. 4.

EXAMPLE VII

A zinc/bromine cell was charged and discharged 30 times without showing any evidence of dendrite growth. This cell contained the deposition solution including 1% by weight of the non-ionic surfactant additive as in above Cell No. 2 of Example IV in the compartment with the negative electrode consisting of a copper foam substate. The above deposition solution of Cell 1 without the above surfactant but with 10% by weight of bromine was in the other compartment with a positive electrode of carbon. A cation exchange membrane was used to effectively separate the two solutions. The open circuit voltage of this cell was 1.8 volts. As many as thirty 2½-hour charge/2½-hour discharge cycles at 50 ma/cm$^2$ were obtained before the experiment was interrupted due to problems not relating to dendrite growth.

While other modifications of the invention and variations thereof which may be employed within the scope of this invention have not been described, the invention is intended to include such as may be embraced within the following claims:

What we claim as new and desire to secure by Letters Patent of the U.S. is:

1. A method for forming a non-dendritic zinc layer which comprises providing a deposition solution containing a zinc compound and from 0.001 to 10 weight percent of a non-ionic surfactant additive which has the formula:

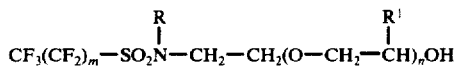

where $m$ is a number from 3 to 15, R is alkyl radical having from 1 to 10 carbon atoms, R$^1$ is a member of a group consisting of hydrogen and methyl radical, $n$ is a number for the group from 0 to 30, and the surfactant additive has a molecular weight range of approximately 550–1500; positioning a pair of spaced apart electrodes within the deposition solution, applying an electric current to the electrodes, and depositing a non-dendritic zinc layer on the negative electrode.

2. A method for forming a non-dendritic zinc layer as in claim 1, in which there is present one percent by weight of the non-ionic surfactant additive.

3. A method for forming a non-dendritic zinc layer as in claim 1, in which there is present one-tenth percent by weight of the non-ionic surfactant additive.

4. A method for forming a non-dendritic zinc layer as in claim 1, in which the zinc compound is zinc bromide.

5. A method for forming a non-dendritic zinc layer as in claim 1, in which the zinc compound is zinc chloride.

6. A deposition solution comprising a solution containing a zinc compound, and from 0.001 to 10 weight percent of a non-ionic surfactant additive having the formula:

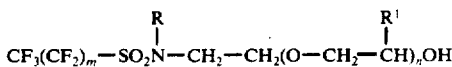

where $m$ is a number from 3 to 15, R is alkyl radical having from 1 to 10 carbon atoms, R$^1$ is a member of a group consisting of hydrogen and methyl radical, $n$ is a number for the group from 0 to 30, and the surfactant additive has a molecular weight range of approximately 550–1500.

7. A deposition solution as in claim 6, in which the zinc compound is zinc bromide.

8. A deposition solution as in claim 6, in which the zinc compound is zinc chloride.

9. A deposition solution as in claim 6, in which the solution contains on a weight basis 62.4% H$_2$O, 15.9% Z$_n$Br$_2$, 15.9%, KBr, 3.2% Al$_2$(SO$_4$)$_3$ and 1.6% H$_3$BO$_3$, and 1.0% of the non-ionic surfactant additive.

10. A deposition solution as in claim 6 in which the solution contains on a weight basis 63.3% H$_2$O, 15.9% ZnBr$_2$, 15.9% KBr, 3.2% Al$_2$(SO$_4$)$_3$ and 1.6% H$_3$BO$_3$, and 0.1% of the non-ionic surfactant additive.

* * * * *